Nov. 20, 1962 HISASHI KANEKO 3,065,302

SYNCHRONIZING SYSTEM IN TIME-DIVISION MULTIPLEX CODE MODULATION SYSTEM

Filed Aug. 19, 1960 2 Sheets-Sheet 1

INVENTOR.
H. KANEKO

BY C. H. Suydam

AGENT

INVENTOR.
H. KANEKO
BY C. H. Suydam
AGENT

United States Patent Office 3,065,302
Patented Nov. 20, 1962

3,065,302

SYNCHRONIZING SYSTEM IN TIME-DIVISION MULTIPLEX CODE MODULATION SYSTEM

Hisashi Kaneko, Tokyo, Japan, assignor to Nippon Electric Company, Limited, Tokyo, Japan, a corporation of Japan Filed Aug. 19, 1960, Ser. No. 50,623
Claims priority, application Japan Nov. 15, 1958
2 Claims. (Cl. 179—15)

This application is a continuation-in-part of applicant's original application, Serial Number 842,897, filed September 28, 1959, and assigned to the same assignee, now abandoned.

This invention relates to a time-division multiplex system employing pulse code modulation and in particular to an improved method of synchronizing the multiplexed received signals with the multiplexed transmitted signals.

An object of the invention is to devise a pulse code modulation system in which the synchronizing pulse is of the same general type as the coded pulses of the speech channels.

Another object of the invention is to devise a pulse code modulation system in which the number of digits in the synchronizing signal is the same as the number of digits in a signal representing a quantized level of the transmitted signal. A digit is identified as a pulse or the absence of a pulse.

Another object of the invention is to decrease the recovery time which is necessary for restoring synchronism at the receiving terminal.

Figure 1:
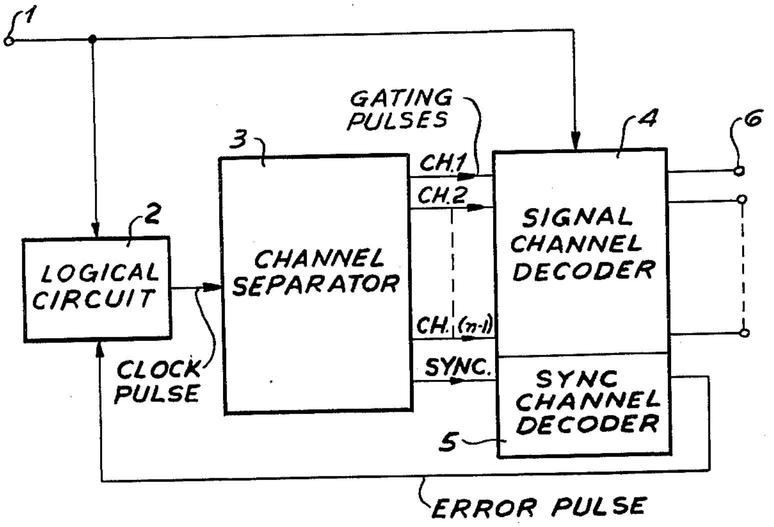
Figure 2A:
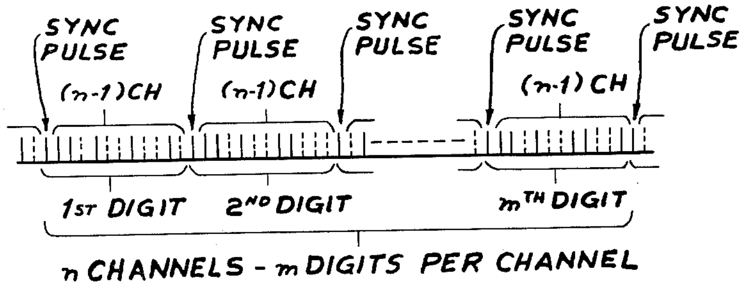
Figure 2B:
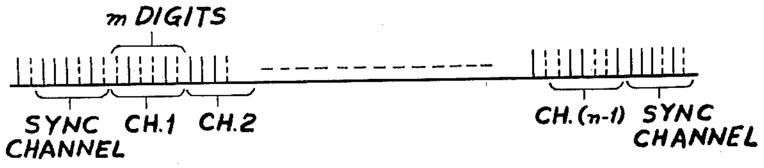
Figure 3:
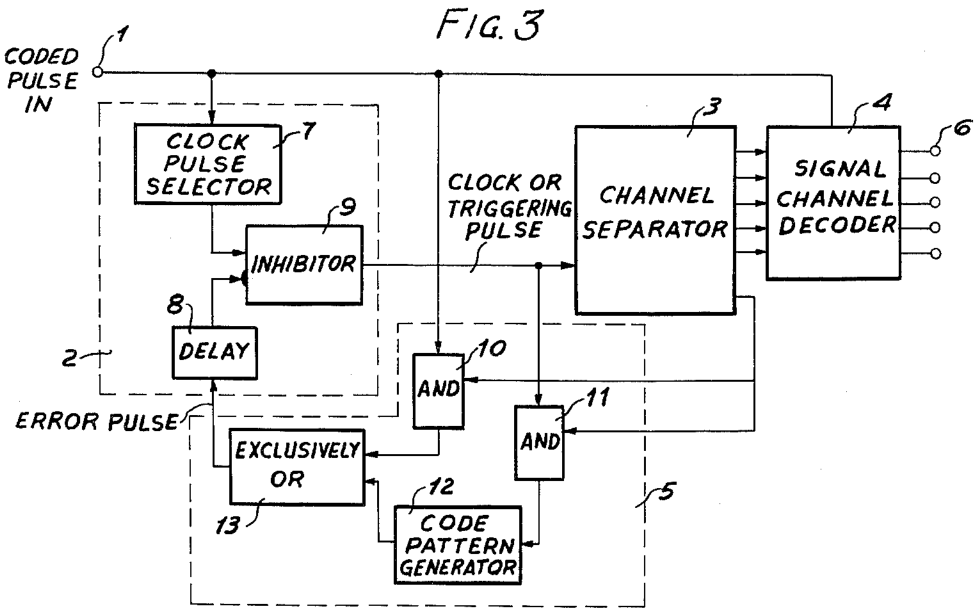
Figure 4:
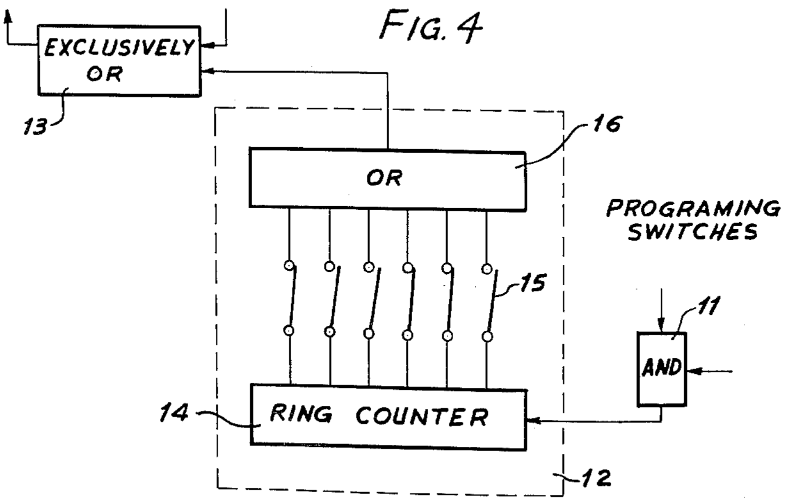

The above-mentioned and other features and objects of this invention will become apparent by reference to the following description taken in conjunction with the accompanying drawings, in which:

FIG. 1 is a schematic diagram of a time-division multiplex code modulation receiving terminal equipment with special reference to the synchronizing circuits;

FIGS. 2(*a*) and (*b*) are illustrative of two types of channel multiplexing which may be used with the synchronizing circuits of the invention;

FIG. 3 is a schematic diagram of a time-division multiplex code modulation receiving terminal equipment which is identical with that shown in FIG. 1 and illustrates the synchronizing circuits in greater detail; and FIG. 4 is a block diagram of a code pattern generator.

In a time-division multiplex pulse modulation system in general, it is required that the sampling time for each channel be synchronized at both the transmitting and receiving ends for channel selection at the receiving end. To meet this requirement, a pulse sequence of one channel has been used as synchronizing pulses, namely, such one channel has been used as a synchronizing channel. In order to discriminate and separate a pulse sequence of this synchronizing channel from pulse sequences of other channels which may be the speech channels, it has ordinarily been necessary to use as the synchronizing pulses such pulses that have a larger amplitude, a greater width, or a different shape, such as twin pulses.

In a time-division multiplex pulse code modulation system, it is not suitable to differentiate the pulses of the synchronizing channel from those of the speech channels by the difference in pulse shape when various factors such as pulse shaping in repeating, construction of equipment, transmission frequency band, signal-to-noise ratio, and so forth are taken into consideration. There is, however, a known method which employs a form of hunting circuit. With this method, synchronizing pulses of the same shape as the speech channel pulses have been used. By making the synchronizing pulses alternately "on" and "off" a synchronizing frequency which is one-half that of the usual sampling frequency (for example 4 kc. in place of 8 kc.) is obtained. The 4 kc. component is selected by a narrow bandpass filter at the receiving end and caused to operate a relay whereby any collapse in synchronism is restored. Such method is described, for example, in J. M. Manley's paper entitled "Synchronization for the PCM Receiver," Bell Laboratories Record, February 1959, page 62. The advantages that are obtained by using PCM signals in the presence of low signal-to-noise ratio may also be obtained when using the pulses of the same shape for synchronizing purposes.

Such a hunting system as just referred to, however, has defects in that in case of collapse in synchronism, the recovering characteristics are poor because of the low pass filters or bandpass filters which are employed in this system in order to monitor the synchronizing channel signal, and hence result in slow response of recovery. Furthermore, the construction of the circuits is complex.

According to the synchronizing system of the present invention the synchronizing pulses are of the same shape as other channel pulses and the synchronizing channel is selected by a simple logical circuit instead of a complex circuit as described in the above-cited reference. The restoration to synchronism is performed by the use of a coded pulse sequence of a channel which happened to be mis-selected in the event of collapse in synchronism. In short, the present invention is featured by the rapidity and the reliability with which synchronism is restored and by the simplicity with which the synchronizing channel can be constructed.

More particularly referring now to FIG. 1, which is a schematic diagram of a time-division multiplex code modulation receiving terminal equipment according to this invention, multiplex pulse code sequences are received at an input terminal 1, and the received input is applied to both a logical circuit 2 and to a signal channel decoder 4 and a synchronizing channel decoder 5.

The receiving multiplex pulse code sequences may broadly be classified into two types depending on the manner of multiplexing a plurality of speech channels and a synchronizing channel. FIG. 2 shows two typical types in which $n-1$ speech channels and one synchronizing channel are multiplexed by an $m$-digit code. In one of them, shown in FIG. 2(*a*), coded pulses of the synchronizing channel and of the $n-1$ speech channels are interlaced in succession at $n$ pulse intervals. In the other type shown in FIG. 2(*b*) each $m$-digit coded pulses of the synchronizing channel and of the $n-1$ speech channels are arranged in succession.

In the case of the multiplex pulse code sequence shown in FIG. 2(*a*), the multiplex pulse code sequences applied to the signal channel decoder 4 are first divided therein into individual speech channels by means of channel-separating or gating pulses supplied thereto from a channel separator 3 and then each series of the separated coded pulses is decoded also in the signal channel decoder 4. In the case of the multiplex pulse code sequences shown in FIG. 2(*b*), on the other hand, the applied multiplex pulse code sequences are first decoded at the signal channel decoder 4 and then the decoded multiplex pulse sequences are also divided therein into individual speech channel signals by means of the gating pulses supplied thereto from the channel separator 3. Thus, decoded signals of the respective speech channels are obtained, in either case, at output terminals 6 which correspond to the speech channels, respectively.

The channel separator 3 in its turn is operated by a trigger signal or clock pulse given thereto from the logical circuit 2. A well-known ring counter, as described by A. E. Johanson in the Bell Laboratories Record for January 1949, on page 10, for example, is used for the channel separator 3 wherein pulses are successively obtained at *n* output terminals connected to both the signal channel decoder 4 and the synchronizing channel decoder 5.

The synchronizing channel decoder 5 is another logical circuit which constitutes a decoder for the synchronizing channel and confirms the existence of predetermined synchronizing pulses in the received multiplex pulse code sequences applied thereto. In case the signal pulse code of the applied multiplex pulse code sequences is different from the predetermined synchronizing pulse code, the synchronizing channel decoder 5 produces an error pulse, which is sent therefrom to the logical circuit 2.

The logical circuit 2 creates a series of clock pulses from the multiplex pulse code sequences applied thereto, and inhibits a clock pulse when the error pulse is fed back from the synchronizing channel decoder 5. It will, therefore, be understood that insofar as the synchronism is maintained, the trigger signal is of a clock pulse form, each pulse occurring at the fundamental pulse repetition frequency of the speech and synchronizing channels of the received multiplex pulse code sequences. This trigger signal causes, in its turn, stepping of the ring counter of the channel separator 3 to maintain the normal channel separating operation.

It will also be understood that when the synchronism has collapsed, an error pulse or a sequence of signals indicating the collapse is produced at the synchronizing channel decoder 5. This decoder 5, wherein an "Exclusive OR" circuit is used, selects the synchronizing channel by way of obtaining the logical product of the supplied synchronizing channel gating pulse and the applied multiplex pulse code sequences, and produces the error pulse only when the selected pulse sequences do not coincide with the predetermined synchronizing code. An error pulse acts in the logical circuit 2 to inhibit a clock pulse. When a coded pulse sequence of a channel selected at the synchronizing channel decoder 5 does not coincide with the synchronizing pulse code, one clock pulse to be sent to the channel separator 3 will drop for each non-coincidence. The existence of an error pulse, or the non-existence of the clock pulse, will delay the counting of the ring counter of the channel separator 3 for one pulse interval. Through succession of this procedure at every non-coincidence the normal condition will be restored when the synchronizing pulse code is eventually selected.

The logical circuit 2 and the synchronizing channel decoder 5 will now be explained in greater detail with special reference to FIG. 3. The logical circuit 2 comprises a clock pulse selector 7, a delay unit 8, and an inhibitor circuit 9. The clock pulse selector 7 is, for example, composed of a narrow band-pass filter which selects the baseband frequency component, namely the fundamental repetition frequency component, from the applied multiplex pulse code sequences and of a circuit which converts the baseband sinusoidal wave into a series of clock pulses of the same frequency. Bandwidth of the filter is chosen as narrow as possible, compared with the baseband frequency or the center frequency of the filter. Such a selector is referred to in the above-mentioned Johanson paper.

The delay unit 8 gives delay time of substantially one clock interval to the error pulse to be sent to the inhibitor circuit 9 from the synchronizing channel decoder 5. At the inhibitor circuit 9, therefore, the error pulse, if it exists, will inhibit the next clock pulse in the clock pulse sequence. The inhibitor circut 9 is a well-known logical circuit such as described by J. Millman and H. Taub in "Pulse and Digital Circuit," a book published by McGraw Hill, 1956, on page 402 et seq.

Thus, the logical circuit 2 gives to the channel separator 3 the trigger signal which substantially is the clock pulses in case no error pulse is produced at the synchronizing channel decoder 5, while it gives to the channel separator 3 no clock pulse with the resulting delay of the application of the gating pulses to the decoders 4 and 5 for one pulse interval per each error pulse.

The synchronizing channel decoder 5 comprises two "AND" circuits 10 and 11, a code pattern generator 12, and an "Exclusively OR" circuit 13. The "AND" circuit 10 selects, by means of the gating pulses sent from the synchronizing channel of channel separator 3, a series of pulses from the applied multiplex pulse code sequences. The AND circuit 11 selects the number of clock pulses which is contained in the synchronizing channel pulse time interval from the clock pulses which have passed through the inhibitor 9 and triggers the code pattern generator 12, which in turn generates a synchronizing code sequence which conforms to the predetermined pulse code.

The code pattern generator is, as shown in FIG. 4, composed of a ring counter 14, a group of programing switches 15, and a logical "OR" circuit 16, each of the switches being connected between the respective output terminals of the ring counter 14 and input terminals of the "OR" circuit 16. The output of the "AND" circuit 11 advances the ring counter 14 one by one. If the ring counter comprises six stages and if the programing switches 15 are positioned as shown in FIG. 4, for example, the synchronizing code sequence which is obtained at the output of the "OR" circuit 16 is 011001.

The "Exclusively OR" circuit or a non-coincidence circuit 13, such, for example, as described in the above-mentioned Millman and Taub's book, page 411 compares the output of the "AND" circuit 10 and of the code pattern generator 12, and derives the error pulse only when the output of the "AND" circuit 10 does not coincide with that of the code pattern generator 12. This means that the error pulse is produced at the very moment where the selected pulse sequence happens to differ from the predetermined synchronizing code.

While the channels are separated at the receiving terminal exactly in synchronism, no error pulse is produced at the "Exclusively OR" circuit 13. Therefore, the normal operation of the receiving terminal equipment is continued in such a way that the clock pulses pass through the inhibitor circuit 9 and advance the ring counter of the channel separator 3 one by one. When the synchronism collapses, error pulses are occasionally produced at the "Exclusive OR" circuit 13 and inhibit the following clock pulses and shift the rotation of, or stop the stepping of, the ring counter of the channel separator 3, by one bit for each error pulse. This is a kind of a hunting procedure which continues until the normal phase of the rotation of the ring counter of the channel separator 3 is eventually restored.

In the synchronizing system of the present invention a circuit having a long time response, such as a narrow band-pass filter, is not present. The circuit, on the contrary, is mostly constructed with a set of logical circuits each of which is practically independent of recovery characteristics, such as time response and other probability properties. Therefore, the hunting procedure is initiated immediately after the discovery of the collapse of synchronism at the "Exclusively OR" circuit 13 by causing only one bit of time delay, namely, the minimum time interval for the hunting operation. As a result, any collapse of the synchronism is very rapidly restored.

The synchronizing pulse sequence is a predetermined code sequence at the transmitting and receiving ends. Whether or not the coded pulse of each speech channel becomes "on" or "off" is subject to the signal given to the channel, and shows probability distribution. Accordingly, the occurrence of the error pulse at the "Exclusive OR" circuit also shows probability distribution in case of collapse of synchronism. Although $2^m$ coded sequences are available by using an $m$-digit binary code for the predetermined synchronizing code, the rapidity of recovery of the collapse of the synchronism will of course be increased by selecting for the predetermined synchronizing code the code sequence that has the least occurrence probability among all $2^m$ coded pulse sequences.

It will be noted here that, although a most fundamental circuit construction has been shown in the present embodiment, simpler constructions may be adopted by changing the method of various logical operations, such as by Boolean algebra in accordance with known logical transformation procedures.

The present embodiment can be applied to signals of various code types by annexing a code conversion circuit. It may be utilized for all types of digital transmission as well.

As has been fully described, the present invention, by employing a simple logical circuit using a pulse sequence of the same general type as the channel pulse sequences in a time-division multiplex code modulation system, provides a synchronizing system superior both in stability and synchronization recovery characteristics. It is of great practical value when applied to a communication system for delivering information expressed in digital quantities such as are used in telephony, telemetering, or telecontrol equipment.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A synchronizing circuit arrangement for a time-division multiplex system employing pulse code modulation and including a plurality of signalling channels and a synchronizing channel, said channels having a predetermined repetition frequency, the pulse code of the synchronizing channel having the same characteristics as the pulse codes representing the signals of the signalling channels comprising: an input terminal for receiving both the signalling code pulses of the signalling channels and the synchronizing code pulses; a channel separator, having a plurality of signal channel outputs and a synchronizing channel output, for providing gating pulses; means connected to said input for generating a train of clock pulses coincident with, and having a recurrent frequency equal to, the fundamental repetition frequency component of the received wave; means coupling said clock pulse generating means and said channel separator for triggering said channel separator with said clock pulses; means connected to said coupling means for inhibiting said triggering; a synchronizing channel decoder connected to said synchronizing channel output and said input and comprising means for generating the synchronizing pulse code sequence and means responsive to gating pulses on said synchronizing channel output for comparing the received pulse code with the generated code and producing an error indication in the absence of coincidence; and delay means responsive to said error indication and connected to said inhibiting means for preventing said channel separator from receiving the next clock pulse.

2. A synchronizing circuit arrangement for a time-division multiplex system employing pulse code modulation and including a plurality of signalling channels and a synchronizing channel, said channels having a predetermined repetition frequency, the pulse code of the synchronizing channel having the same characteristics as the pulse codes representing the signals of the signalling channels comprising: an input terminal for receiving both the signalling code pulses of the signalling channels and the synchronizing code pulses; a channel separator, having a plurality of signal channel outputs and a synchronizing channel output, for providing gating pulses; means connected to said input for generating a train of clock pulses coincident with, and having a recurrent frequency equal to, said repetition frequency; means coupling said clock pulse generating means and said channel separator for triggering said channel separator with said clock pulses; a synchronizing channel decoder; a synchronizing code pattern generator in said decoder; a first AND gate in said decoder connected on its output to said code pattern generator for the triggering thereof to the next coded pulse in the synchronizing code sequence and having an input connected to said coupling means and an input connected to said synchronizing channel output; a second AND gate in said decoder having an input connected to said input terminal and an input connected to said synchronizing channel output; an exclusively OR circuit connected to the outputs of said second AND gate and the output of said code pattern generator for producing an error indication when the code signals received over said input terminal via said second AND gate do not coincide with the output of said pattern generator; and means connected to said coupling means and responsive to said error indication for inhibiting the triggering of said channel separator and said code pattern generator via said first AND gate by the next clock pulse.

References Cited in the file of this patent

UNITED STATES PATENTS 2,949,503 Andrews et al. ---------- Aug. 16, 1960